United States Patent
Marrocco et al.

(10) Patent No.: US 10,534,350 B2
(45) Date of Patent: Jan. 14, 2020

(54) FLEXIBLE PRESSING VERIFICATION SYSTEM

(71) Applicants: Ford Motor Company, Dearborn, MI (US); ABB Technology AG, Zurich (CH)

(72) Inventors: Alexander Marrocco, Windsor (CA); Hossein Firoozgan, Walled Lake, MI (US); Joosok Jinn, Grosse Ile, MI (US); Isaac Zolotarev, Farmington Hills, MI (US); Arnold Bell, Brighton, MI (US)

(73) Assignees: Ford Motor Company, Dearborn, MI (US); ABB Technology AG, Zurich (CH)

( * ) Notice: Subject to any disclaimer, the term of this patent is extended or adjusted under 35 U.S.C. 154(b) by 208 days.

(21) Appl. No.: 15/195,438

(22) Filed: Jun. 28, 2016

(65) Prior Publication Data

US 2017/0371320 A1    Dec. 28, 2017

(51) Int. Cl.
*G05B 19/418* (2006.01)

(52) U.S. Cl.
CPC ............ *G05B 19/41805* (2013.01); *G05B 2219/45152* (2013.01)

(58) Field of Classification Search
None
See application file for complete search history.

(56) References Cited

U.S. PATENT DOCUMENTS

| 3,174,322 A | 3/1965 | Cookson |
| 4,741,078 A | 5/1988 | Kimura |
| 5,357,675 A | 10/1994 | Danmoto et al. |
| 5,761,785 A | 6/1998 | Connolly |
| 5,940,967 A * | 8/1999 | Wuyts ............. H01R 43/205 29/842 |
| 5,993,592 A | 11/1999 | Perego |
| 6,228,203 B1 | 5/2001 | Kotoyori et al. |
| 6,834,428 B2 * | 12/2004 | Ravert, Jr. ......... H01R 43/205 29/842 |
| 7,318,715 B2 | 1/2008 | Markeli |
| 8,079,143 B2 | 12/2011 | Zhang et al. |
| 8,342,478 B1 | 1/2013 | Cordray et al. |
| 8,607,426 B1 | 12/2013 | Coggins et al. |

(Continued)

FOREIGN PATENT DOCUMENTS

| CN | 1407212 A | 4/2003 |
| CN | 201807890 U | 4/2011 |

(Continued)

OTHER PUBLICATIONS

Great Britain Search Report for corresponding Application No. GB1503029.9, dated Jul. 6, 2015, 1 page.

*Primary Examiner* — Ryan A Jarrett
(74) *Attorney, Agent, or Firm* — Raymond Coppielle; Brooks Kushman, P.C.

(57) ABSTRACT

A flexible pressing system for accepting and rejecting pressed part into a part may include a pressing apparatus configured to press components into a hole of a part and a controller programmed to receive press data for a press of at least one of the components, the press data including force, distance and time of the press, and determine whether the force is indicative of an inadequate press based on the force and distance at a specific time of the press.

14 Claims, 8 Drawing Sheets

(56) References Cited

U.S. PATENT DOCUMENTS

| | | |
|---|---|---|
| 2002/0029450 A1 | 3/2002 | Kondo |
| 2002/0100159 A1 | 8/2002 | Swartz et al. |
| 2003/0079338 A1* | 5/2003 | Juranitch ................ B23P 19/02 29/705 |
| 2009/0118858 A1 | 5/2009 | Wallace et al. |
| 2011/0081486 A1 | 4/2011 | McCamy et al. |
| 2013/0327104 A1 | 12/2013 | Haselboeck |
| 2014/0290060 A1 | 10/2014 | Kikukawa et al. |
| 2015/0066199 A1 | 3/2015 | Shimono |
| 2016/0152102 A1 | 6/2016 | Campbell |

FOREIGN PATENT DOCUMENTS

| | | |
|---|---|---|
| CN | 202292622 U | 7/2012 |
| CN | 202668049 U | 1/2013 |
| JP | S6224925 A | 2/1987 |
| JP | S6322234 A | 1/1988 |
| JP | 2012241519 A | 12/2012 |
| WO | 2008087702 A1 | 7/2008 |

\* cited by examiner

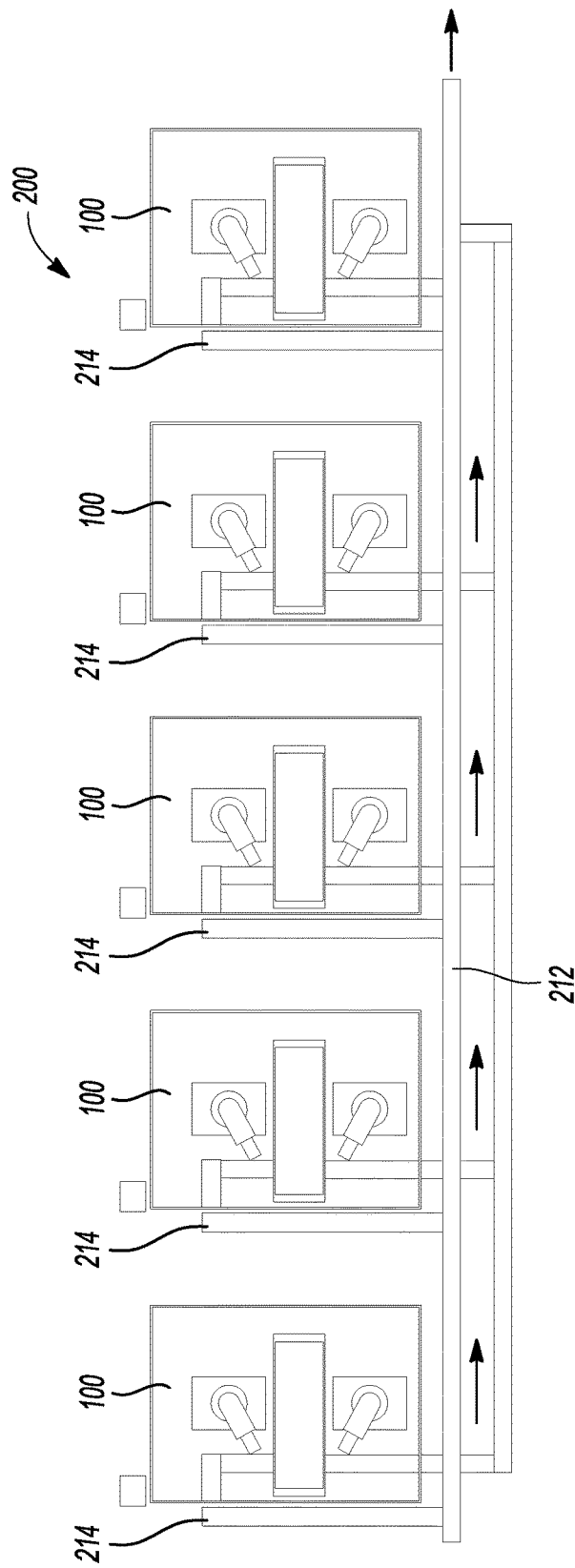

FLEXIBLE PRESSING VERIFICATION SYSTEM

TECHNICAL FIELD

This disclosure relates to a flexible pressing system.

BACKGROUND

Assembly of parts such as cylinder heads, engine blocks, axles and transmissions originally were performed manually with the parts to be assembled being installed by workers with hand tools. Parts, such as caps, spark plug tubes, cup plugs, ball seals, dowel pins, oil restrictors, bearings seals, crush spacers, bushings, and the like, are pressed into openings that may be coated with a lubricant/sealer. Problems with manual assembly operations include inconsistent results, assembly quality defects, and excessive labor costs.

Dedicated assembly lines were developed to increase consistency and reduce labor costs. However, dedicated assembly lines lack flexibility and are limited to assembling one model of a part and cannot be used for other similar parts without substantial changeover downtime. Dedicated assembly lines make it difficult to control of the quality of pressed-in component part operations. If a part is improperly installed, omitted from an assembly, or the wrong component is installed, the part must be taken off-line for repair or scrapped. If a new part assembly line is developed, long lead times are required to build new dedicated tools. Dedicated pressing operation tools require a substantial amount of manufacturing floor space and capital investment.

SUMMARY

A flexible pressing system may include a pressing apparatus configured to press components into a hole of a part and a controller programmed to receive press data for a press of at least one of the components, the press data including force, distance and time of the press, and determine whether the force is indicative of an inadequate press based on the force and distance at a specific time of the press.

A method for analyzing a flexible press process may include receiving press data for a press of at least one of component of a part, the press data including force and distance over time of the press, and determining whether the force is indicative of an inadequate press based on the force and distance at a specific time of the press.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

FIG. 2 illustrates an example assembly line system including the pressing system;

DETAILED DESCRIPTION

Figure 1A:
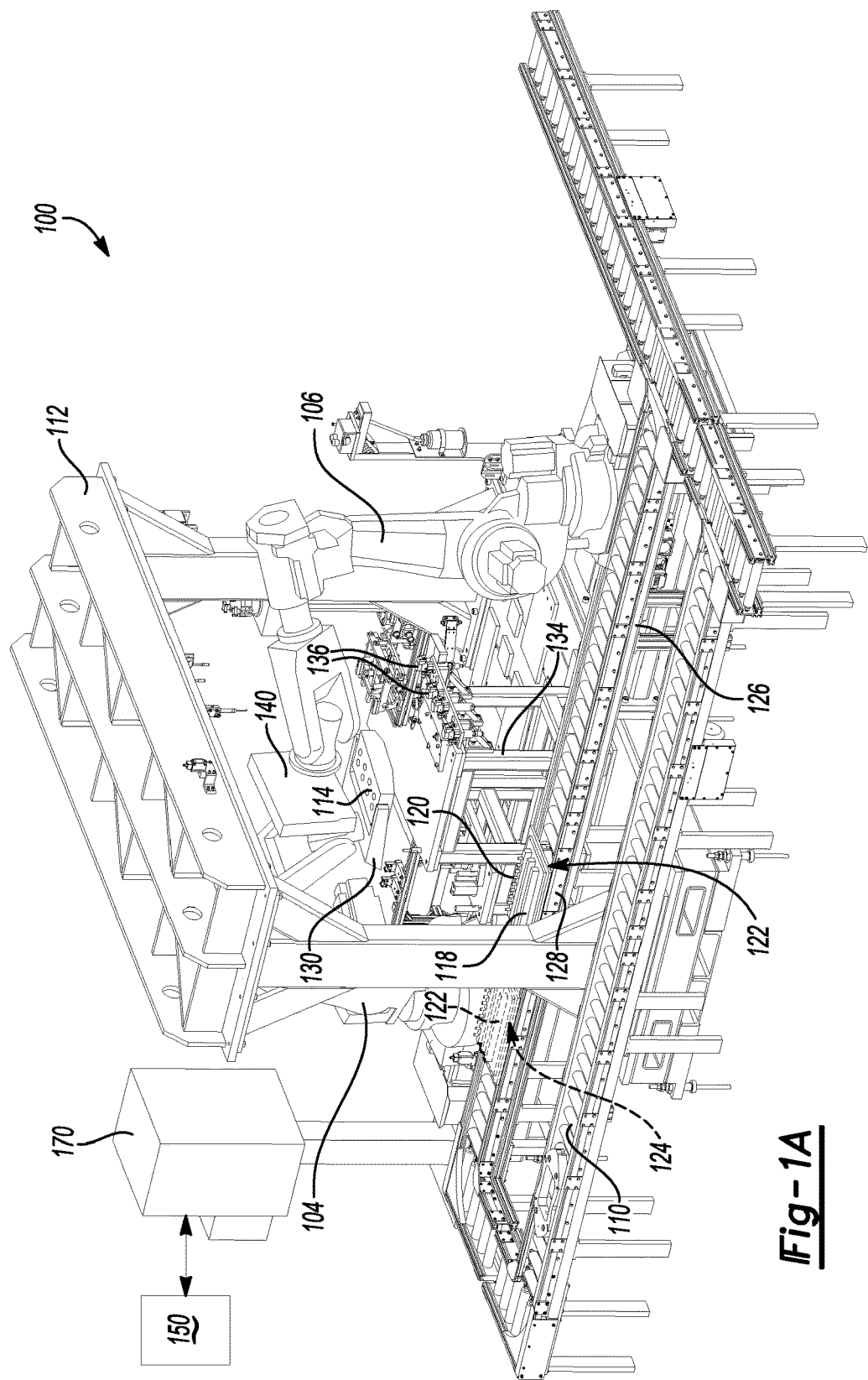
FIGS. 1A and 1B illustrate a perspective view of an example pressing system.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

During traditional pressing operations, pressing of various vehicle parts, such as cylinder heads, are performed in multiple, separate operations across an assembly line. In these series-based assembly processes, if any operation fails along the assembly line, the entire assembly line is stopped. Furthermore, these systems require unique machines designed for each pressing operation with redundant fixture press tooling that is specific to the component part. The pressing of the parts may include multiple components being pressed on different faces of the part and serial based assembly processes may require the parts to be flipped, rotated, etc., to permit the pressing.

Further, verification processes for the serial based pressing processes are also arranged across manufacturing facilities and often require multiple error-proofing points. This can cause the quality control of the pressing process to be tedious, onerous, and increase the in-plant scrap rates. Additionally, existing manufacturing operations do not support a flexible manufacturing strategy, and require a separate assembly line for each type of part.

Disclosed herein is an integrated control system including a flexible pressing system for part assemblies that coordinates robots, enabling high speed, high control operation between two or more robots and integrated servo operations. The flexible pressing system may include a pair of robots, the first of which loads and unloads the parts from the pallet. The second robot picks the parts and tools and presses the parts into the machined holes of the part. The parts may be pressed by one of the two servo presses, which may press two parts in tandem, two parts in a stitch-like manner, or one part.

The disclosed system may be a parallel pressing system that reduces single path operations to improve line uptime. The system may permit for a flexible assembly line architecture that allows for several different part types to be assembled (e.g., FWD, RWD, gas, diesel, PRI, GTD, etc.). This architecture includes two boundary conditions per line, allowing a changeover of cylinder-head assemblies during shutdowns and shut-offs. In contrast, the series-based processes often require six to nine months of shut-down time to achieve a changeover. For example, the assembly architecture may change from assembly a cylinder-head for a V engine (e.g., V6 or V8) to a cylinder-head for an Inline engine (e.g., I3 or I4) without undue down time of the assembly line.

Furthermore, the disclosed system provides an integrated error proofing system that allows for verification during assembly. By continually monitoring the presses of the various components, certain parts may be scrapped prior to installing remaining components, saving on material waste, as well as assembly line clean up. Additionally, some press inadequacies may be remedied by re-processing the problem part, saving the entire cylinder-head from being scrapped. When re-processing various parts, the process may easily be configured to press only the necessary parts, leaving the previously properly installed parts.

A single controller may control each robot, as well as a sealant dispenser. A pressing tool on the second robot may provide feedback to the controller for each press (i.e., for each part). This feedback may be used to identify various inadequacies with the presses. Furthermore, the controller may manipulate movement of each robot during the press operation so as to maximize efficiency, avoid crashing, and maintain a part history for each part pressed into the cylinder-head.

While the examples herein may be directed to cylinder-head assemblies, the processes described herein may also be applied to other commodities such as such as cylinder heads, engine blocks, axles and transmissions, etc.

Figure 1B:
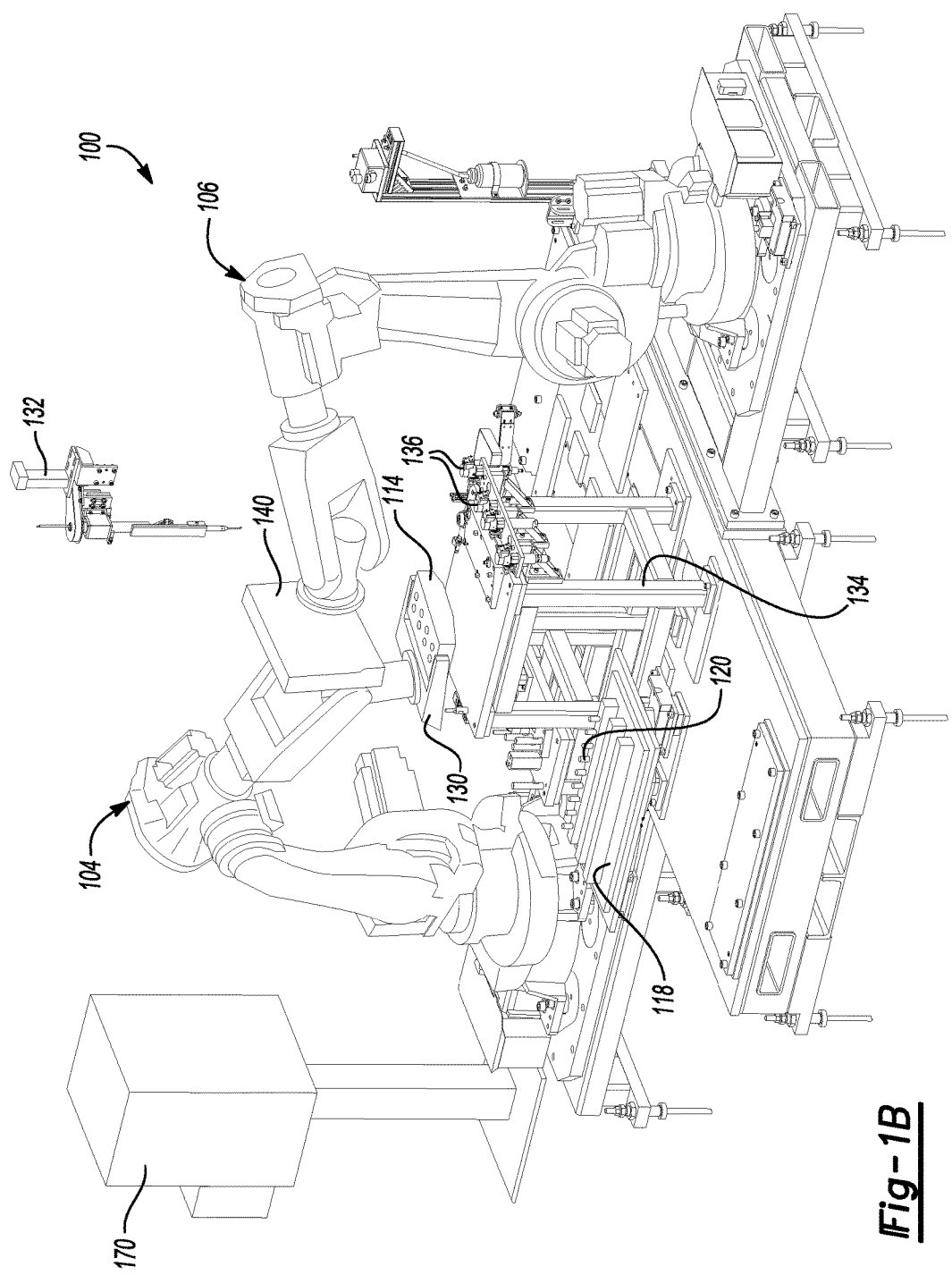

FIGS. 1A and 1B illustrate a perspective view of an example pressing system 100. The pressing system 100 may include a first robot 104 and a second robot 106. The pressing system 100 may also include a conveyor 110 (as shown in FIG. 1A) and a press reaction structure 112 (as shown in FIG. 1A). A part 114 (e.g., cylinder-head) may be provided to the pressing system 100 on a pallet 118 via the conveyor 110. The pallet 118 may also provide kitted components 120 for the pressing system 100. The kitted components 120 may include cup plugs, ball plugs, dowels, spark plug tubes, among other components. The kitted components 120 may be configured to be pressed into machined holes of the part 114.

The pallet 118 may move along the conveyor 110 and be placed in position for the pressing process to be initiated. The pallet 118, part 114, and kitted components 120 may make up a first pallet assembly 122. Multiple pallets 118 carrying parts 114 and kitted components 120 may be concurrently moved along the conveyor 110. The first pallet assembly 122 may progress from a first conveyor position 126 to a second pallet position 128. A second pallet assembly 124 may be arranged on the conveyor and may move into the first conveyor position 126 as the first pallet assembly 122 moves into the second pallet position 128 (as shown by way of example in FIG. 1A). By continually providing the second pallet assembly 124 as the first pallet assembly 122 is still in the midst of its pressing processes, down time is reduced. Further, by allowing for dual positions of the pallet assemblies 122, 124 during their pressing process, the next pallet assembly may be moved into a ready-position prior to completion of the pressing process of the pallet assembly currently undergoing the pressing process.

The pressing system may include a liquid dispenser 132, as shown in FIG. 1B and as also referred to as sealant dispenser 132 herein, is configured to dispense sealant and/or lubricant into the machined holes of the part 114. The sealant dispenser 132 may include a nozzle configured to apply sealant to at least one of the machined holes. The pressing system 100 may also include a base 134 configured to maintain the part 114 during the pressing of the components 120 into the machined holes. The base 134 may act as a table to absorb at least a portion of the force during pressing. The base 134 may include or maintain various tools 136. The tools 136 may include any number of tools configured to grip and press the components 120 into the part.

The first robot 104 may be a robot including at least one arm and may be responsible for part manipulation/orientation. The first robot 104 may include a gripper assembly 130 configured to engage the part 114 and load and unload the part 114 from the pallet 118. The gripper assembly 130, in combination with the arm of the first robot 104, may be configured to axially, laterally, and vertically position the part 114 in any number of positions, before, during, and after pressing.

The second robot 106 may be similar to the first robot 104 and may include at least one arm. The second robot 106 may be responsible for part picking, part pressing, and quick tool change. The second robot 106 may include a pressing tool 140 configured to engage and pick up the various kitted components 120 from the pallet 118 and install the kitted components 120 within the machined holes of the part 114. The pressing tool 140 is discussed in more detail with respect to FIG. 3 below. The pressing tool 140, in combination with the arm of the second robot 106, may be configured to move axially, laterally, and vertically to position the appropriate components within the machined holes of the part 114. As explained in more detail herein, the first robot 104 and the second robot 106 may coordinate their movements to eliminate down-time, increase production speed, and eliminate errors during the pressing process. For example, while the first robot 104 is positioning the part 114 at the sealant dispenser 132, the second robot 106 may be selecting an appropriate tool from the base.

The pressing system 100 may include a controller 150. The controller 150 may be in communication, either wired or wirelessly, with robots 104, 106, sealant dispenser 132, and other components, including other pressing systems 100. The controller 150 is described in more detail below with respect to FIG. 3.

FIG. 2 illustrates an example assembly line system 200. The assembly line system 200 may include a plurality of pressing systems 100, each having interconnected conveyors 110. The pressing system 100 may share a main conveyor 212 and each pressing system 100 may include sub-conveyors 214 arranged in a u-shape to receive the pallet 118 from the main conveyor 212 for that specific pressing system 100 and output the same pallet 118 back to the main conveyor 212 once the pressing process is complete.

Figure 3:
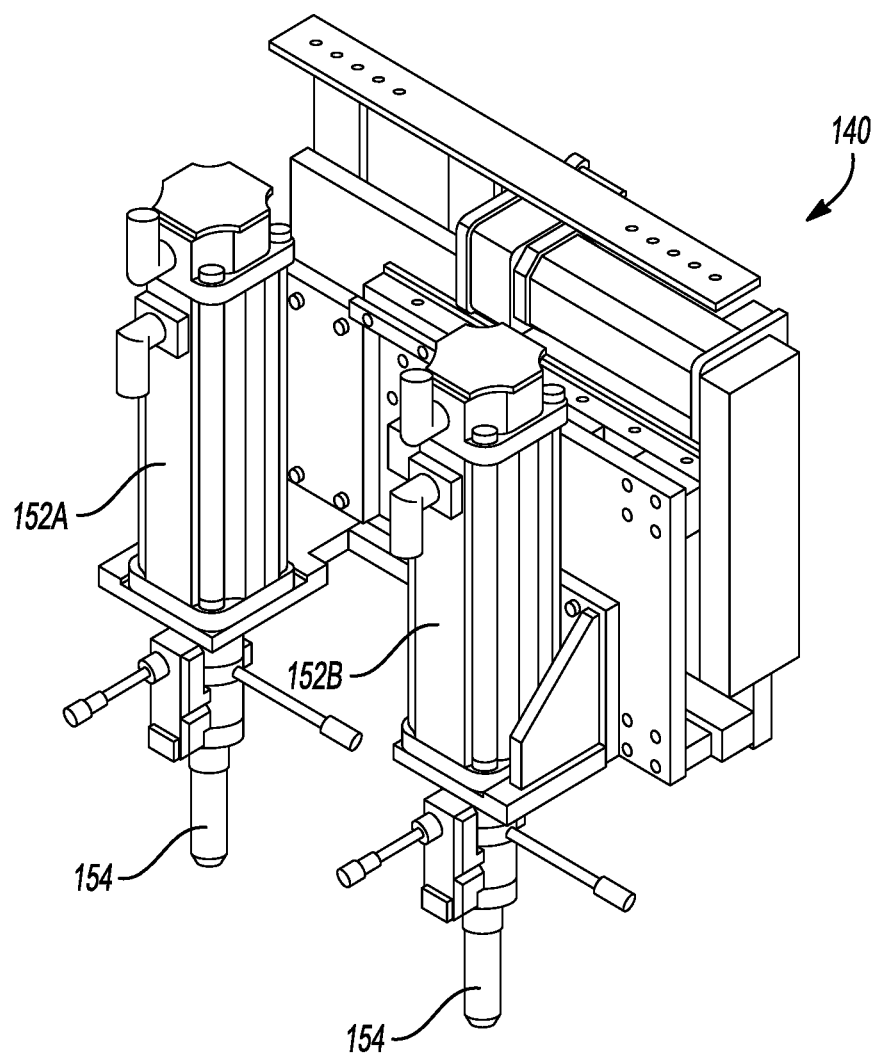
FIG. 3 illustrates a pressing tool of the pressing system.

FIG. 3 illustrates the pressing tool 140 arranged with the second robot 106. The pressing tool 140 may include one or more plurality electric servos 152 (labeled individually as first servo 152A and second servo 152B) configured to press the components 120 into the manufactured holes of the part 114. The servos 152 may be configured to move vertically in order to press the various components into the machined holes of the cylinder-head. Additionally, the second servo 152B may be configured to move laterally with respect to the first servo 152A, permitting variable distances there between. The second robot 106 may vary the pitch or angle of the pressing tool 140 to accommodate placement of the components 120 by the servos 152 at various angles. Components 120 may be pressed at the all sides of the part 114. The gripper assembly 130 may maneuver the part 114 to an appropriate orientation so that the pressing tool 140 may abut the press reaction structure 112 during pressing. The servos 152 may press respective components in tandem, or in a stitch-like manner, or one at a time. While two servos 152 are shown by way of example in the Figure, three or more servos may also be implemented.

The controller 150 may instruct the second servo 152B to move laterally while the second robot 106 adjusts the pitch of the pressing tool 140. This concurrent movement increases the speed at which the second robot 106 may ready itself for pressing. The second robot 106 may ready itself for pressing while the first robot 104 is performing another function on the part 114 such as placing the part 114 at the sealant dispenser 132.

The servos 152, along with the tools 136, may be configured to release and engage the various components 120. This may be initiated by a vacuum supply (not shown) or other gripping apparatus configured to apply suction at a distal end 154 of the servos 152. The tools 136 may then be secured to the servos 152 by a gripping mechanism that incorporates a quick tool exchange mechanism. The second robot 106 may then move the pressing tool to the pallet 118. The tools 136 may pick up the appropriate kitted component 120. Because tools 136 are arranged at the base 134, the tools 136 may be quickly and efficiently interchanged by the servos 152. While the first robot 104 is carrying out a function, the second robot 106 may be releasing and selecting tools in preparation for pressing of the next component 120.

Figure 4:
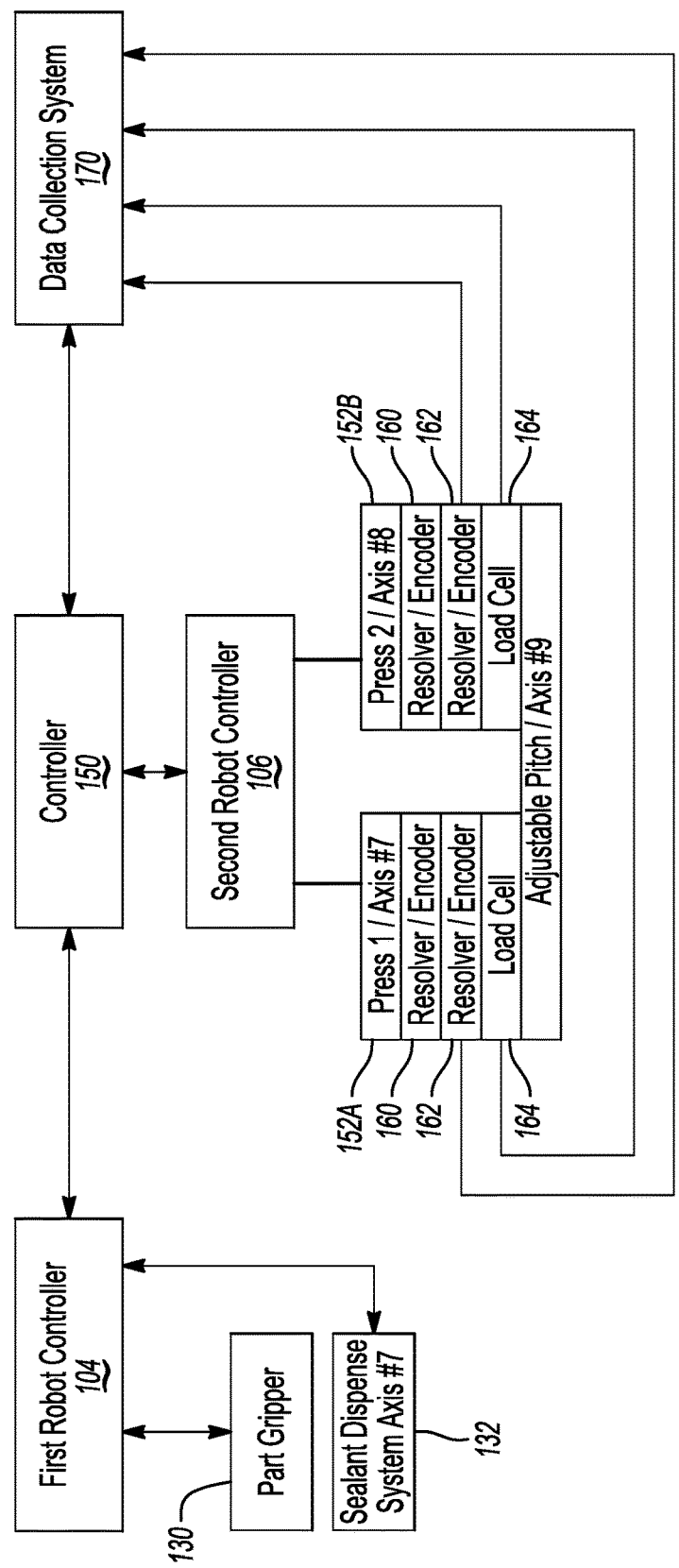
FIG. 4 illustrates an example block diagram of the pressing system.

FIG. 4 illustrates an example block diagram of the pressing system 100 including the controller 150. The controller 150 may include a processor configured to carry out computer executable instructions. The controller 150 may be coupled to and configured to communicate with the first robot 104 and the second robot 106.

The second robot 106 may include the pressing tool 140, which includes the servos 152. Each servo 152 may be controlled independent of the other. Each servo 152 is monitored by the data collection system 170 using an encoder/resolver 160, 162 for distance and a load cell for force feedback. Each servo 152 may include at least one resolver/encoder 160, 162 configured to provide rotational distance information for each servo 152. A resolver/encoder 160, 162 may also be in communication with the controller 150 to provide a digital position of the servo 152. A load cell 164 may communicate a force or torque. While the second robot 106 may instruct each servo 152 as to the specific tool, placement (e.g., location of the servos 152 including axis 7, axis 8, and axis 9), and depth of each component 120. The servo 152 may also in turn provide press feedback (e.g., press data) in the forms of various analog and digital signals representative of force, distance, and time for each pressed component.

The pressing system 100 may also include a data collection system 170 configured to provide an analysis of the pressing system 100. The data collection system 170 may be an off-board system operated and manufactured by a separate entity. The data collection system 170 may receive the press data from servos 152. Although shown as a separate component, the data collection system 170 may be included as part of the controller 150. The data collection system 170 may analyze the press data and determine whether any of the presses were erroneous.

Figure 5A:
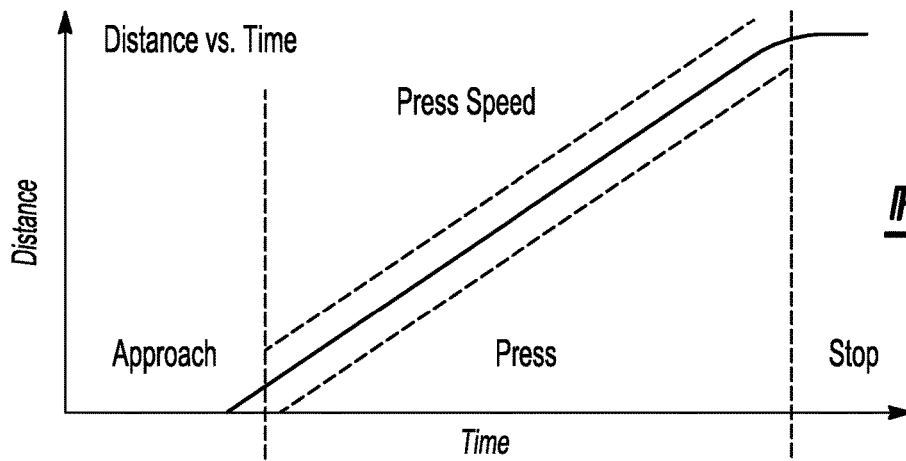
FIGS. 5A-5C illustrate press data analysis charts.
Figure 5B:
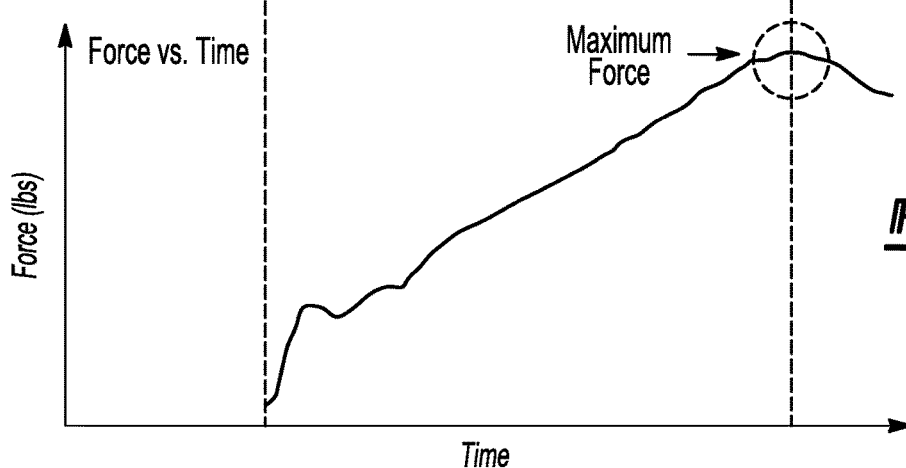
Figure 5C:
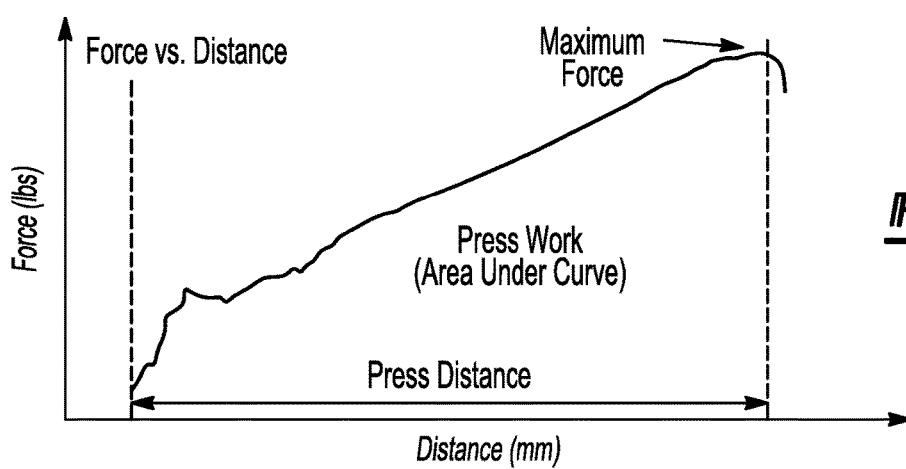

The pressing system 100 may also include a data collection system 170 configured to data mine the press data to identify and learn various trends with respect to the press data. The data collection system 170 may provide the analyzed data and generate waveforms for the same. The waveforms, which are shown by way of example in FIGS. 5A-5C, illustrate how the data may be used to identify adequate and inadequate presses. The data collection system 170 may include a controller and a processor configured to carry out the instructions described herein.

The data collection system 170 may in turn determine whether the press was adequate, or whether an error exists for the press. That is, the data collection system 170 may accept/reject the press. The data collection system 170 may collate the analyzed press data to determine if, which ones, and how many inadequate presses are identified for the part 114. The data collection system 170 may also collate the analyzed press data as to which inadequate presses were identified. Depending on this determination, the data collection system 170 may determine whether to scrap the part 114 (in the event of a double press or deep press), whether to re-process certain components (in the event of a shallow press), or whether to re-insert certain components (in the event of a missing part). Additionally or alternatively, the controller 150 may not wait until all presses have been complete to make this determination. In certain circumstances where the part 114 may be scrapped, the controller 150 may decide to cease pressing and save the remaining un-pressed parts for use in another part. The controller 150 may provide instructions to the first robot 104 and the second 106 so that the part 114 may be assembled. The controller 150 may provide sequencing of movements of the first robot 104 and second robot 106 to minimize down time during the pressing process of any of these components. In one example, while a machined hole of the part 114 is being lubricated by the sealant dispenser 132 and first robot 104, the second robot 106 may be readying itself to press a part into that hole. The second robot 106 may pick an appropriate tool 136, pick up a component 120 with that tool, and adjust the servos 152 concurrently.

The controller 150 may instruct the first robot 104 to move the part 114 into a sealant position at the sealant dispenser 132, and coordinate movements of first robot 104, and dispenser 132 so that one of the holes may receive sealant. Concurrently, the second robot 106 may be selecting a tool 136 for its next press, as well as acquire kitted components 120 from pallet 118. The first robot 104 and may move the part 114 between the sealant position and a pressing position at the pressing tool 140 until each of the components 120 have been pressed. By eliminating the downtime by concurrently moving the robots via the single controller 150, the pressing system 100 cuts down on assembly time.

FIGS. 5A-5C illustrate various charts for analyzing the press data. FIG. 5A is a chart illustrating distance vs. time for a press. The distance may be represented by the rotational distance and/or digital position of the servo 152. The time may be associated with each distance and provided to the controller 150 via the resolver/encoder 160, 162 upon supplying the distance data. Additionally or alternatively, the controller 150 may maintain its own time clock and associate the incoming data with a time stamp. As shown by way of example in FIG. 5A, in a typical press, the depth of the servo 152 increase over time as the component 120 is pressed into the machined hole of the part 114.

FIG. 5B is a chart illustrating force vs. time for a press. The force data may be supplied by the load cell 164. As shown by way of example, the force varies, but generally increases to a maximum force over time. That is, towards the end of the press, the force may be at its highest.

FIG. 5C is a chart illustrating force vs. distance for a press. As shown, in general, as the distance increases, so does the force.

Figure 6:
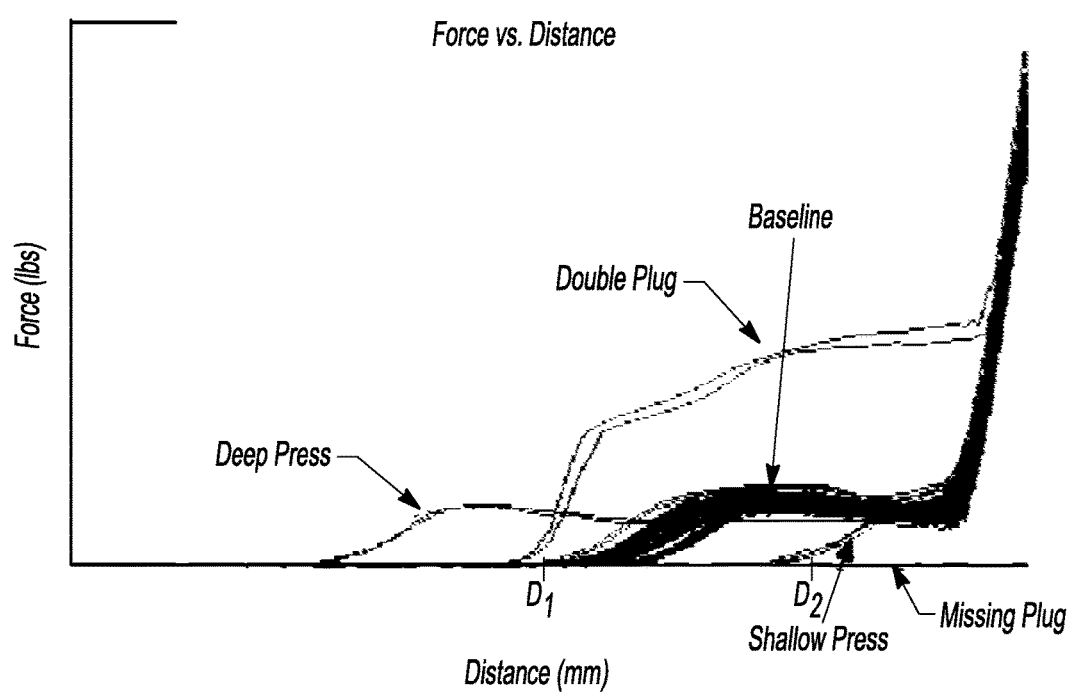
FIG. 6 illustrates an example chart of force vs. distance of a pressed component.

FIG. 6 illustrates an example chart for the force vs. distance of various pressed components. FIG. 6 is a chart illustrating force vs. distance for pressed in components. As shown by way of example in FIG. 6, certain press inadequacies may be identified when charted against a baseline set of acceptable presses of similar components 120. The baseline may include a collection of acceptable presses and may be used to detect inadequacies or anomalies. Furthermore, by tracking the force at various distances with respect to the baseline, the type of inadequacy may be identified, allowing for the appropriate remedial steps to be taken. A deep press may be shown when the force exceeds a predetermined deep press force. A double plug may be recognized when a force exceeds a predefined double plug force at a predefined distance. A shallow press may be recognized when a force fails to increase at a predefined distance, and a missing plug may be recognized when the force remains at approximately 0.01N after approximately a predefined distance range. Other examples of anomalies include oversized holes, lack of liquid (e.g., lack of lubricant or sealant), wrong parts, etc.

Figure 7:
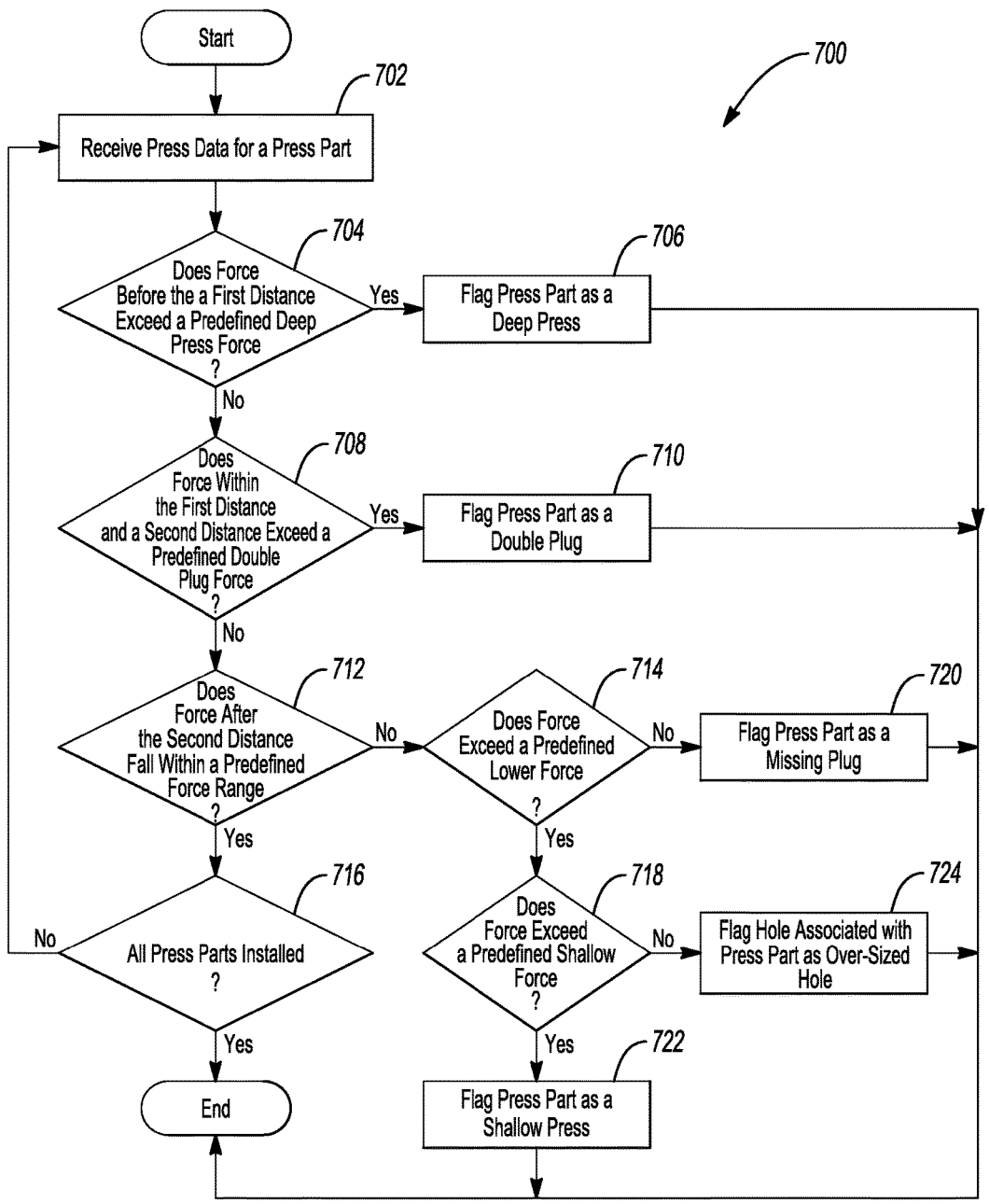
FIG. 7 illustrates an example process for analyzing press data.

FIG. 7 illustrates an example process 700 for analyzing the press data. While the process 700 is described as being carried out by the data collection system 170 and the controllers thereof, the process 700 may also be carried out, at least in part, by the controller 150. Other controllers and processors may also perform all or part of the process 700.

The process 700 may begin at block 702 where the data collection system 170 may receive press data. The press data may include the various forces, distances, and times for a specific press, as well as the specific press part, location, etc. Various press parts or components 120 may have specific force thresholds or limits at certain distances. The data collection system 170 may maintain in a database (not shown) a birth history for each component 120. Furthermore, the controller 150 may maintain various look-up tables configured to provide the thresholds and ranges for specific component types.

At block 704, the data collection system 170 may determine whether the forces before a first distance D1 exceed a predefined deep press force. The first distance D1 may be a distance at which the baseline indicates as a typical press initiating. That is, at this distance, the second robot 106 may initiate pressing of the component 120 into the part 114. As explained, this distance may be determined by analyzing a plurality of adequate presses. The predefined deep press force may be a force that flags a press as a deep press. That is, anything exceeding this force may indicate that a cup plug has been pressed too deep within the machined hole. The predefined deep press force may vary depending on the type of component 120 being pressed. In one example, the predefined deep press may be a force of 2500N (e.g., top cup plugs). In another example (e.g., intake cup plugs), the predefined deep press force may be a force of 4000N. If the forces exceed the predefined deep press force, the process 700 proceeds to block 706. If not, the process 700 proceeds to block 708.

At block 706, the data collection system 170 may flag the press as a deep press. In this case, because a deep press is irreparable, the part 114 may be scrapped.

At block 708, the data collection system 170 may determine whether the forces between the first distance D1 and a second distance D2 exceed a predefined double plug force. The second distance D2 may be a distance at which the baseline levels out. The predefined double plug force may be a force that flags a press as a double plug. That is, more than one plug being pressed to the same hole. In one example (e.g., top cup plugs), the predefined double plug force may be a force of 6000N. In another example (e.g., intake cup plugs), the predefined double plug force may be a force of 10,000N. If the forces exceed the predefined double plug force, the process 700 proceeds to block 710. If not, the process 700 proceeds to block 712.

At block 710, the data collection system 170 may flag the press as a double plug. In this case, because a double plug is irreparable, the part 114 may be scrapped.

At block 712, the data collection system 170 may determine whether the forces after the second distance D2 are within a predefined force range. The predefined force range may be a range is considered acceptable for the distance and type of component 120. For example, this range may include forces that are indicative of a normal press in-progress. In one example (e.g., top cup plugs), the predefined force range may be 200N to 3000N. In another example (e.g., intake cup plugs), the predefined force range may be 0.2N to 7000N. If the forces are within the predefined force range, the process 700 proceeds to block 714. If not, the process 700 proceeds to block 716.

At block 714, the data collection system 170 may determine whether the forces after the second distance D2 exceed a predefined lower force. The predefined lower force may be a force greater than 0N, indicating that a component pressed has been pressed, but that it was pressed either too late or with too little force. If the forces exceed the predefined lower force, the process 700 proceeds to block 718. If not, the process 700 proceeds to block 720.

At block 718, the data collection system 170 may determine whether the forces exceed a predefined shallow force. The predefined shallow force may be a force above 0.0N, but below the lowest force of the predefined force range. If the forces exceed a predefined shallow force, the process 700 proceeds to block 722. If not, the process proceeds to block 724.

At block 722, the data collection system 170 may flag the press as a shallow press. In this case, the component 120 may not have been fully pressed into the hole. The data collection system 170 may send the part 114 back through the pressing process to remedy this shallow press.

At block 724, the system may flag the hole associated with the pressed as an oversized hole. In this case, the forces may be above 0.0N, but below the predefined shallow press force. In this case, because a double plug is irreparable, the part 114 may be scrapped.

At block 720, the data collection system 170 may flag the press as a missing plug. In this case, for various reasons, a plug may not have been pressed into the hole. The controller 150 may send the part 114 back through the pressing process to place a plug in the appropriate hole.

At block 716, the data collection system 170 may determine whether all parts have been installed in the part 114. That is, the controller 150 may determine whether all presses have taken place. If so, the process 700 ends. If not, the process 700 returns to block 702. In some examples, where the part may be scrapped due to an inadequate press, such as those flagged in blocks 706 and 708, the controller 150 may instruct the first and second robots 104, 106 to cease pressing of the remaining components 120 in order to salvage the unused components 120 and decrease waste and time spent on this specific part 114. Will be replaced by description of the modified FIG. 4.

Accordingly, disclosed herein is a flexible pressing operation having coordinated multi-robot high speed motion and press and dispenser control. The unique press optimization and press analysis strategies decrease scrap parts and downtime of the assembly line. The parallel process strategy increases system uptime, and enables line re-balancing, asset re-deployment and extended life of the system.

The process may be used to install a wide variety of pressed-in components such as cup plugs, ball seals, dowels, oil restrictors, spark plug tubes, head/tail cups, bearings, seals, crush spacers, brushings, valve seats, valve guides, etc. The system includes quality improvements and enables timely introductions of new customer driven products, reducing new equipment lead time. Further, re-tool times are reduced and two product architectures may be concurrently manufactured through the same assembly line. Cost savings for re-tooling may be reduced and more components may be installed in less time.

Computing devices, such as the controller 150 and data collection system 170 processors, controllers, etc., generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included with in a computing device employing a computer operating system such as one of those mentioned above, and are accessed via a network and any one or more of a variety of manners. A file system may be accessible for a computer operating system, and make the files stored in various formats. An RDBMS generally employs the Structure Query Language (SQL) in addition to language for creating, storing, editing, and executing stored procedures, such as PL/SQL language mentioned above.

In some examples, system elements may be implemented as computer-readable instructions (e.g., software) on one or more computing devices (e.g., servers, personal computers, etc.) stored on computer readable media associated there with (e.g., disks, memories, etc.). A computer program product may comprise such instructions stored in computer readable media for carrying out the functions described herein.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A flexible pressing system, comprising:
    a pressing apparatus configured to press components into a hole of a part;
    a controller programmed to:
        receive press data for a press of at least one of the components, the press data including force, distance and time of the press, and
        determine whether the force is indicative of an inadequate press based on the force and distance at a specific time of the press;
        classify, in response to the force exceeding a predefined double plug force, the press as a double plug; and
        instruct the apparatus to cease pressing of the components into the part in response to classifying the press as a double plug.

2. The system of claim 1, wherein the controller is further configured to classify the press as a deep press in response to the force exceeding a predefined deep press force.

3. The system of claim 1, wherein the controller is further configured to classify the press as a missing plug in response to the force failing to exceed a predefined lower force.

4. The system of claim 3, wherein the controller is further configured to instruct the pressing apparatus to reprocess the component associate with the missing plug.

5. The system of claim 1, wherein the controller is further configured to classify the press as a shallow press in response to the force exceeding a predefined lower force but failing to fall within a predefined force range.

6. The system of claim 5, wherein the controller is further configured to instruct the pressing apparatus to reprocess the component associate with the shallow press.

7. A method for analyzing a flexible press process, comprising
    receiving press data for a press of at least one of component of a part, the press data including force and distance over time of the press,
    classifying, in response to determining that the force fails to exceed a predefined lower force, the press as a missing plug; and
    instructing the apparatus to cease pressing of the components into the part in response to classifying the press as a missing plug.

8. The method of claim 7, wherein classifying the force includes determining whether the force before a first distance exceeds a predefined deep press force.

9. The method of claim 7, wherein classifying the force includes determining whether the force after a first distance and before a second distance exceeds a predefined double plug force.

10. The method of claim 7, wherein classifying the force includes determining whether the force after a second distance fails to exceed a predefined lower force.

11. The method of claim 7, wherein classifying the force includes determining whether the force after a second distance exceeds a predefined lower force but fails to fall within a predefined force range.

12. The method of claim 7, wherein classifying the force includes analyzing a baseline set of acceptable presses.

13. The method of claim 7, wherein classifying the force includes determining whether the force after a second distance exceeds a predefined shallow force but fails to fall within a predefined force range.

14. A flexible pressing system, comprising:
    a pressing apparatus configured to press components into a hole of a part;
    a controller programmed to:
        receive press data for a press of at least one of the components, the press data including force, distance and time of the press, and
        determine whether the force is indicative of an inadequate press based on the force and distance at a specific time of the press;
        classify the press as a shallow press in response to the force exceeding a predefined lower force but failing to fall within a predefined force range;
        instruct the apparatus to cease pressing of the components into the part in response to classifying the press as a shallow press; and instruct the pressing apparatus to reprocess the component associate with the shallow press.

* * * * *